US010096205B2

(12) United States Patent
Wright et al.

(10) Patent No.: US 10,096,205 B2
(45) Date of Patent: Oct. 9, 2018

(54) RETROFITTABLE CONVERSION DEVICE

(71) Applicant: Paltronics Australasia Pty Limited, Taren Point, New South Wales (AU)

(72) Inventors: Dean Wright, Taren Point (AU); Stephen Cowan, Taren Point (AU)

(73) Assignee: PALTRONICS AUSTRALASIA PTY LIMITED, New South Wales (AU)

( * ) Notice: Subject to any disclaimer, the term of this patent is extended or adjusted under 35 U.S.C. 154(b) by 0 days.

(21) Appl. No.: 15/217,672

(22) Filed: Jul. 22, 2016

(65) Prior Publication Data

US 2017/0024960 A1 Jan. 26, 2017

(30) Foreign Application Priority Data

Jul. 22, 2015 (AU) ................................ 2015205889

(51) Int. Cl.
*G06F 17/00* (2006.01)
*G07F 17/32* (2006.01)

(52) U.S. Cl.
CPC ...... *G07F 17/3227* (2013.01); *G07F 17/3211* (2013.01); *G07F 17/3216* (2013.01); *G07F 17/3258* (2013.01)

(58) Field of Classification Search
None
See application file for complete search history.

(56) References Cited

U.S. PATENT DOCUMENTS

2002/0144115 A1* 10/2002 Lemay .................... G06F 21/51 713/168
2003/0176213 A1* 9/2003 LeMay ................... G07F 17/32 463/20
2005/0113162 A1* 5/2005 Olive .................. G07F 17/3244 463/16
2008/0113709 A1* 5/2008 Beadell ................... G07F 17/32 463/16
2008/0171592 A1* 7/2008 Doan ...................... G07F 17/32 463/25
2009/0270176 A1* 10/2009 Motyl ..................... G07F 17/32 463/42
2009/0291749 A1* 11/2009 Durham .............. G07F 17/3213 463/25
2010/0081500 A1* 4/2010 Phillips ................... G07F 17/32 463/29
2010/0261529 A1* 10/2010 Bleich ..................... G07F 17/32 463/36
2011/0117981 A1* 5/2011 Baerlocher ......... G07F 17/3244 463/16

(Continued)

*Primary Examiner* — Paul A D'Agostino

(74) *Attorney, Agent, or Firm* — Henry J. Daley; Venable LLP

(57) ABSTRACT

If it is desired to convert an EGM 2 into an EGM that is configured to provide a stand-alone progressive jackpot, then the conversion device 1 is retrofitted into the EGM 2. The conversion device 1 includes a processor 6 that is configured to administer the stand-alone progressive jackpot. The processor 6 is communicatively connected to both the plurality of input ports 3 and the plurality of output ports 5. The processor 6 is also communicatively connected to memory 8. A flowchart setting out the steps performed in a first method of using the conversion device 1 to provide a stand-alone progressive jackpot is illustrated in FIG. 2.

20 Claims, 2 Drawing Sheets

(56) References Cited

U.S. PATENT DOCUMENTS

| | | | | |
|---|---|---|---|---|
| 2012/0083908 | A1* | 4/2012 | Carpenter | G07F 17/3211 700/91 |
| 2012/0289325 | A1* | 11/2012 | Kyte | G07F 17/3258 463/27 |
| 2013/0084975 | A1* | 4/2013 | Erickson | G07F 17/3209 463/29 |

* cited by examiner

RETROFITTABLE CONVERSION DEVICE

TECHNICAL FIELD

The present invention relates to a conversion device that is retrofittable into an electronic gaming machine (EGM). Embodiments of the present invention find application in the gaming industry.

BACKGROUND ART

Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

In the highly competitive environment of the gaming industry there is a strong drive to make EGM's as engaging and interesting as possible so as to attract the patronage of players. Over time, older EGM's may become less attractive to players in comparison to newer EGM's that may offer additional features. Hence, it has been appreciated by the inventors of the present application that it may be desirable to increase the functionality of some older EGM's in an effort to improve their attractiveness to players.

SUMMARY OF THE INVENTION

It is an object of the present invention to overcome, or substantially ameliorate, one or more of the disadvantages of the prior art, or to provide a useful alternative.

In one aspect of the present invention there is provided a retrofittable conversion device for converting an electronic gaming machine (EGM) not having a stand-alone progressive jackpot into an EGM having at least one stand-alone progressive jackpot, said retrofittable conversion device including:

an input port for receipt of data from the EGM;

an output port; and a processor configured to be responsive to said data so as to progressively accumulate at least one jackpot amount, said processor being responsive to a trigger so as to cause a jackpot award signal to be sent from the output port.

Preferably the retrofittable conversion device is sized so as to be housable within a cabinet of the EGM.

In one embodiment the data includes a turnover of the EGM and the processor is configured so as to increment the jackpot by a proportion of the turnover.

In one embodiment the trigger is triggered when the jackpot amount is incremented to, or in excess of, a trigger amount. In another embodiment the data includes a game result and the trigger is triggered when the game result falls within a pre-defined subset of game results.

Preferably the retrofittable conversion device has a plurality of output ports, at least one of the output ports being communicatively linkable to a centralised monitoring system. More preferably, at least some of the output ports replicate a plurality of output ports native to the EGM.

Typically the EGM has a gaming machine interface card and the input port of the retrofittable conversion device receives said data from said gaming machine interface card.

In one embodiment the processor is configured so as to receive a display signal from the EGM and to adapt the display signal of the EGM so as to produce an adapted display signal that includes a current value of the jackpot amount and to cause the EGM to display the adapted display signal. In another embodiment a secondary display is retrofittable onto the EGM so as to be visible by a player of the EGM and the secondary display is driven by the conversion device so as to display a current value of the jackpot amount.

In one embodiment the EGM has native credit dispensing hardware and the jackpot award signal is sent from the output port to the EGM so as to instruct the EGM to use the native credit dispensing hardware to pay the jackpot to a player of the EGM. In another embodiment credit dispensing hardware is retrofittable to the EGM and the jackpot award signal is sent from the output port to the retrofitted payout hardware so as to instruct the retrofitted credit dispensing hardware to pay the jackpot to a player of the EGM. In yet another embodiment, the jackpot award signal is sent from the output port so as to instruct an attendant to pay the jackpot to a player of the EGM. In this embodiment the processor is responsive to a triggering of the trigger so as to send an instruction to the EGM to freeze play of the EGM until such time as the attendant provides an input to the EGM to confirm that payment of the jackpot has occurred.

The features and advantages of the present invention will become further apparent from the following detailed description of preferred embodiments, provided by way of example only, together with the accompanying drawings.

BRIEF DESCRIPTION OF THE ACCOMPANYING DRAWINGS

DETAILED DESCRIPTION OF PREFERRED EMBODIMENTS OF THE INVENTION

Prior to retrofitting of the preferred embodiment 1, the EGM 2 is not configured to provide a stand-alone progressive jackpot. Rather, the EGM 2 is merely configured to provide one or more base games, which, for example, may be slot machine games, card games, keno, bingo and/or any of a large number of other known alternative base games.

In a manner that is well known to those skilled in the art, the EGM 2 has a Gaming Machine Interface Card (GMIC) 7 that enables signals encoding gaming data to be communicated to a centralised monitoring system (CMS) 4. The EGM 2 also has a display, player operable input means such as buttons and/or a touch sensitive screen, and credit receiving/dispensing hardware such as a currency acceptor/validator and/or a ticket reader/writer.

Figure 1:
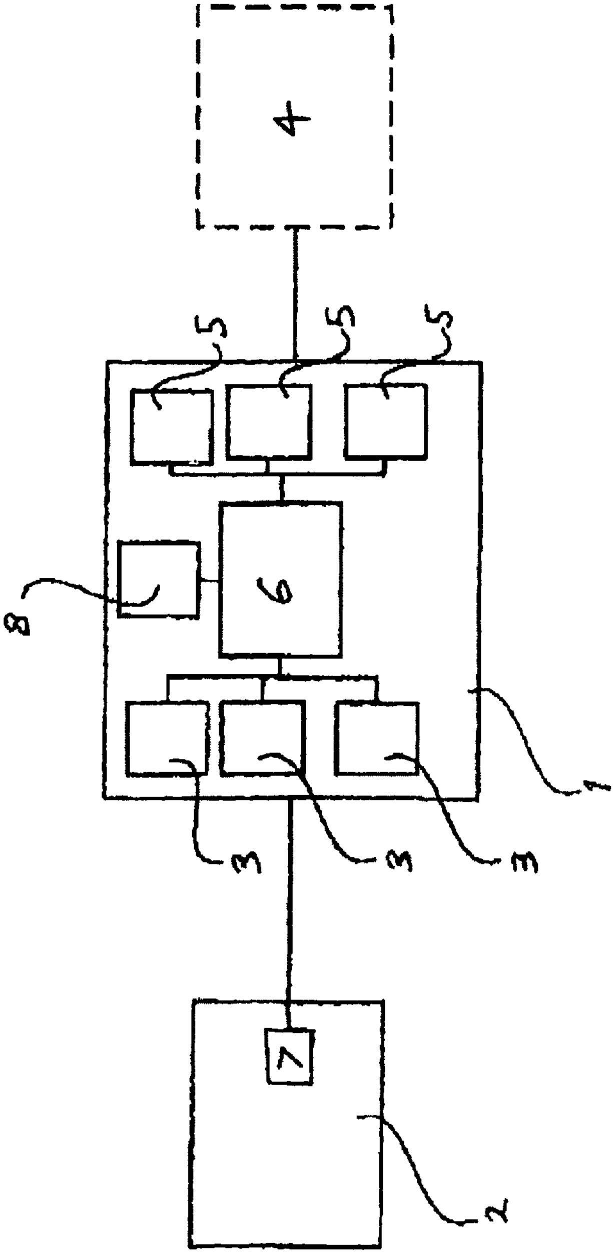
FIG. 1 is a schematic depiction of an embodiment of the invention.

If it is desired to convert the EGM 2 into an EGM that is configured to provide a stand-alone progressive jackpot, then the conversion device 1 is retrofitted into the EGM 2. This is done by opening the cabinet of the EGM 2 and installing the conversion device 1 within the cabinet (the conversion device 1 is illustrated as physically separate to the EGM 2 in FIG. 1 merely for the sake of clarity). The conversion device 1 is sized so as to be housable within some of the spare volume within the EGM's cabinet. Then one or more cables are used to connect the plurality of input ports 3 of the conversion device 1 to the EGM 2 via the GMIC 7 (or via a subsidiary equipment port or a manufacturer specific port). The conversion device 1 includes a plurality of output ports 5, which replicate the ports of the GMIC 7. These output ports 5 on the conversion device 1 are connected to the centralised monitoring system (CMS) 4 so as to communicate both the EGM data and the stand alone jackpot data to the CMS as required by the regulations of the applicable jurisdiction. Some embodiments of the conversion device 1 include another output port 5 that is connected via a cable to the EGM 2 to allow signals to flow from the processor 6 of the conversion device 1 to the EGM 2. The final step in the retrofitting process is optionally to alter the programming of the base game(s) to make alterations that will be discussed in more detail below, which renders the EGM 2 more suited to function in conjunction with the stand-alone progressive jackpot. This concludes the retrofitting process.

This gaming information that is received at the input ports 3 from the EGM's GMIC 7 includes an indication of the total turnover of the EGM 2, which is updated each time gaming activity on the EGM 2 changes the total turnover. As each base game that is being executed by the EGM concludes, the information also includes an indication of the results of the concluded base game.

The conversion device 1 includes a processor 6 that is configured to administer the stand-alone progressive jackpot. The processor 6 is communicatively connected to both the plurality of input ports 3 and the plurality of output ports 5. The processor 6 is also communicatively connected to memory 8. Non-limiting examples of suitable memory 8 may include one or more RAM chips, a CPU cache, a hard drive, and so forth.

Figure 2:
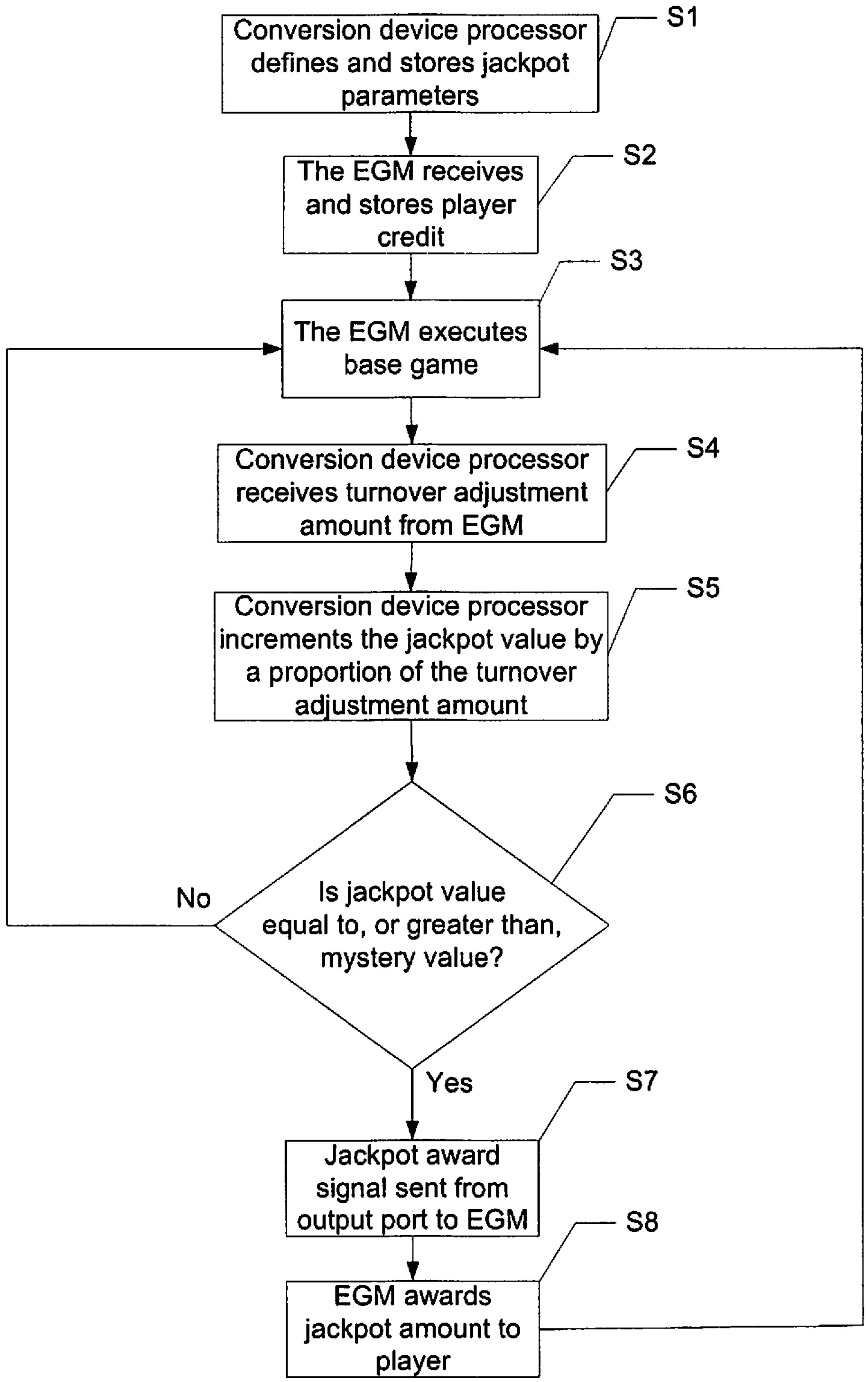
FIG. 2 is a flowchart showing steps performed in a method for using the preferred embodiment to provide a stand-alone progressive jackpot.

A flowchart setting out the steps performed in a first method of using the conversion device 1 to provide a stand-alone progressive jackpot is illustrated in FIG. 2. At step S1 the parameters of the stand-alone progressive jackpot are defined by the processor 6 of the conversion device 1. Some of these parameters are defined by an input provided by the operator of the gaming system (i.e. the venue management), such as:

A start-up amount, which is an amount of funds that has been allocated to allow the jackpot to commence at a positive non-zero value. For the sake of a non-limiting running example, we shall assume that the start-up amount is $10.00. The start out amount is displayed to the player of the EGM 2 using one of the display options that are discussed in detail below.

A proportion of turnover that is allocated towards accumulation of the jackpot. For the sake of the running example, we shall assume that the proportion is 20%.

An upper value, which is a value by which the jackpot must have been awarded. The player of the EGM is made aware of this amount and, for the sake of the running example, we shall assume that this value is $100.

Some of the jackpot parameters are automatically defined by the processor 6, such as:

A trigger amount in the form of a mystery value, which is not communicated to the players. Once the jackpot has accumulated to a value that is equal to, or greater than the mystery value, an award of the jackpot is triggered. The processor 6 is configured so as to randomly (or pseudo-randomly) select a mystery value that lies within a range defined at the lower end by the start-up value and at the upper end by the upper value. For the sake of the running example, we shall assume that the mystery value is $84.35.

In one embodiment the operator opens the EGM cabinet and physically connects a laptop or other portable digital device to the conversion device 1 so as to load the jackpot parameters into the memory 8 of the conversion device 1. However, an alternative embodiment includes a communications link from the conversion device 1 to a remote gaming system (not illustrated) and, in this embodiment, the jackpot parameters are downloadable from the remote gaming system to the memory 8 without requiring the operator to physically access the conversion device 1.

Once these jackpot parameters have been defined, the values are stored within the memory 8 so as to be available to the processor 6 for later processing by the processor 6 of the conversion device 1.

At step S2 the EGM 2 receives credit from a player. The EGM's credit receiving hardware may take one or more of a number of forms that are well known to those skilled in the art, such as a cash acceptor/validator into which the player may insert coins and/or notes, a card reader configured to read data from a player ID card, a ticket reader into which the player may insert a ticket, etc. The EGM 2 is configured so as to store and display a value representing the current amount of the player's credit.

At step S3 the player makes an input upon a player operable input means that is provided upon the EGM so as to commence execution of the base game on the EGM 2. Some typical examples of such input means include buttons, touch sensitive screens, etc. For the sake of the running example, we shall assume that the player has elected to play a base game costing $1.00. In response to this player input the EGM 2 decrements the current value of the player's credit by $1.00 and then executes the base game, which may, or may not, result in the award of a prize to the player. Once the base game has concluded, the EGM 2 communicates data to the conversion device via the cable running from the GMIC 7, via the input ports 3 and onto the processor 6 of the conversion device 1. This data is received by the processor 6 at step S4.

At step S5 the processor 6 of the conversion device 1 extracts an amount by which the turnover has increased from the data received from the EGM 2. In the running example, this amount is $1.00. The processor 6 of the conversion device 1 is configured so as to multiply this amount by the proportion that has been stored in memory 8, which is 20% in the running example, giving an amount of $0.20. This amount is added to the current value of the jackpot, which means in the running example the jackpot amount is incremented from its start-up value of $10.00 to a new value of $10.20. This new value is displayed to the player of the EGM 2.

It will be appreciated by those skilled in the art that EGM's are typically programmed so as to provide a fixed return-to-player (RTP) percentage over the long term. For the sake of the running example, we shall assume that the base game of the EGM 2 prior to retrofitting of the conversion device 1 had an RTP of 92%. However, once the conversion device 1 commences operating, 20% of the turnover of the EGM 2 will be allocated to the stand alone progressive jackpot and eventually won by a player of the EGM 2. Hence, if it is desired to retain the original RTP percentage when retrofitting the conversion device 1 to the EGM 2, then it is necessary to alter the EGM's base game execution software to adjust the base game's RTP down to 72%. With this alteration, the addition of the base game's RTP of 72% and the jackpot's RTP of 20% gives the desired value of 92%.

In the embodiment described in the preceding paragraph, the base game's RTP of 72% and the jackpot's RTP of 20% is fixed once the conversion device 1 has been retrofitted to the EGM 2. However, another embodiment makes use of the invention disclosed in the applicant's PCT Application No. PCT/AU2005/000668, which was published as WO/2005/107913 in November 2005, to provide the player with an option to make an input selecting a split of RTP percentages that are applicable to the base game and the jackpot. The contents of PCT/AU2005/000668 are hereby incorporated into this patent specification in their entirety. In this embodiment, once the player has selected a split (such as, for example, one of the four options shown in the table on page 6 of PCT/AU2005/000668), the conversion device 1 and the EGM 2 are responsive to that selection so as to implement the applicable RTP percentages in the base game and jackpot respectively.

At step S6 the processor 6 of the conversion device 1 conducts a comparison to determine whether the jackpot value is equal to, or greater than, the mystery value. In the running example, the jackpot value is $10.20 and the mystery value is $84.25 and hence this comparison yields a negative result and the process flow loops back to step S3 where, subject to sufficient credit being available, the player may either cash out or commence the execution of another base game on the EGM2.

As the process flow proceeds multiple times through loop S3 to S6, the jackpot amount progressively accumulates until eventually the jackpot amount is equal to, or in excess of, the mystery value and the comparison at step S6 yields a positive result. This triggers the award of the jackpot. The process flow proceeds to step S7 at which the processor 6 of the conversion device 1 causes a jackpot award signal, which includes an indication of the jackpot amount, to be sent from the output port 5 to the EGM 2.

Receipt of the jackpot award signal at step S8 instructs the EGM 2 to use its native credit dispensing hardware to pay the jackpot amount to a player of the EGM. When the conversion device 1 was retrofitted into the EGM 2, the EGM's software was re-programmed so as to include a routine that is to be executed by the EGM upon receipt of the jackpot award signal. Firstly the EGM's processor extracts the jackpot amount from the jackpot award signal. Next, the EGM's processor is programmed so as to display a message notifying the player that the jackpot has been won and this includes an indication of the jackpot amount. Then, depending upon the type of credit dispensing hardware that is native to the EGM 2, this may result in:

- The EGM's credit meter being incremented by the jackpot amount; or
- The player receiving a cash payout of the jackpot amount; or
- A ticket having the jackpot amount encoded or printed thereon, or the like. (For this option, the player is typically required to take the ticket to a cashier to receive the jackpot amount.)

As an alternative to use of the EGM's native credit dispensing hardware, another embodiment requires additional credit dispensing hardware to be retrofitted to the EGM 2. In this embodiment the jackpot award signal is sent from the output port 5 of the conversion device 1 to the retrofitted credit dispensing hardware. This instructs the retrofitted credit dispensing hardware to pay the jackpot to a player of the EGM 2. This alternative embodiment does not require the EGM's software to be adapted so as to cater for payment of the jackpot amount to the player.

In another embodiment (which also does not require the EGM's software to be adapted so as to cater for payment of the jackpot amount to the player) the jackpot award signal is sent from the output port 5 of the conversion device 1 to a remote notification system, such as a desktop computer, that is monitored by an attendant, who is typically an employee of the gaming venue. In this embodiment, the jackpot award signal includes not only the jackpot amount, but also an identification of the EGM 2 from which the conversion device 1 has sent the jackpot award signal. In this embodiment, once the conversion device 1 has determined that the jackpot award has been triggered, the processor 6 sends an instruction to the EGM 2 to freeze play on that EGM. Once the remote notification system receives the jackpot award signal it notifies the attendant of the jackpot amount and the identified EGM 2. Once the attendant sees this notification, the attendant makes his or her way to the identified EGM 2 and pays the jackpot amount to the player of that EGM or provides that player with a voucher for the jackpot amount. Once payment has been made, the attendant provides an input to the EGM 2 to confirm that payment of the jackpot has occurred. In some such embodiments the attendant uses a key or a swipe card or keys a code onto a key pad to make this input. Receipt of this input unfreezes play on the EGM 2. This embodiment is suited to applications in which the jackpot amount may be too large to be paid out by either the EGM's native credit dispensing hardware or by retrofitted credit dispensing hardware.

In yet another embodiment the conversion device 1 is configured so as to provide the jackpot to the player in the form of one or more cash and/or non-cash bonuses, as described in the applicant's Granted Australian Patent No. 2005240227, the contents of which are hereby incorporated in their entirety by way of cross reference.

Once the jackpot has been awarded at step S8, the process flow loops back to step S3 where, subject to sufficient credit being available, the player may either cash out or commence the execution of another base game on the EGM 2.

In the above-described embodiment, the award of the jackpot was triggered when the jackpot amount was accumulated to a value that was equal to, or more than, a mystery value. However, other embodiments make use of alternative triggers. For example, in an embodiment the trigger is triggered when a base game result falls within a pre-defined subset of game results. In one such embodiment the base game is a poker card game and the data communicated from the EGM 2 to the conversion device 1 at the conclusion of a base game includes the poker hand held by the player at the conclusion of the card game. In this embodiment the pre-defined subset of game results is any poker hand that comprises a royal flush (i.e. a poker hand which consists of the ace, king, queen, jack and ten of a suit). Hence, in this embodiment, if the player gets a royal flush in a base game, this also triggers an award of the jackpot amount.

At various points throughout the method illustrated in FIG. 2 it is desirable to inform the player of aspects of the stand-alone progressive jackpot. For example, whilst the jackpot amount is accruing, it is desirable to display the current amount to the player so that it may contribute to increased player excitement. Additionally, when awarding the jackpot, it is preferable to display suitable award graphics. In one embodiment information relating to the jackpot is displayed on a secondary display that is retrofitted onto the EGM 2 when the conversion device 1 is retrofitted into the EGM. This takes the form of a display screen on a box that is affixed to the outside of the EGM's cabinet. This secondary display is positioned so as to be visible by the player of the EGM and it is driven by the conversion device 1 so as to display relevant information such as a current value of the jackpot amount and, when applicable, the award graphics.

In another embodiment, the software of the EGM 2 is re-programmed upon retrofitting of the conversion device 1 to allow the processor 6 of the conversion device 1 to provide information relating to the jackpot to the EGM so that the information may be displayed on the native EGM display. Hence, in this embodiment the EGM's native display shows not only information relating to the base game, but also information relating to the jackpot.

In yet another embodiment (in which it is not necessary to re-programme the EGM's display software) the processor 6 of the conversion device 1 is configured so as to receive a display signal from the EGM 2. This display signal encodes the display that would otherwise be displayed on the native display of the EGM 2. However, in this embodiment this signal is not shown on the EGM's native display, but is rather communicated from the EGM 2 to the processor 6. The processor 6 then adapts the EGM's display signal so as to produce an adapted display signal that includes not only information about the base game, but also information about the jackpot, such as a current value of the jackpot amount, for example. This altered display signal is then communicated from the conversion device 1 back to the EGM 2 so that it may be displayed on the native display of the EGM 2. In this embodiment the processor 6 adapts the display signal by re-mapping some or all of the pixels comprising the native display to provide room for the inclusion of information relating to the jackpot. For example, in one embodiment the native display is re-scaled so as to compress the vertical dimension of the native display by a small amount, thereby providing room at the top or the bottom of the screen for a scrolling banner that informs the player of the jackpot related information. In another such embodiment the processor 6 adapts the EGM's display by superimposing the jackpot information on an otherwise underutilised portion of the screen. In yet another such embodiment the processor 6 uses a watermark effect to include the jackpot information on the native display.

In the above-described embodiments the EGM 2 prior to retrofitting of the conversion device 1 did not have any jackpot-type functionality. However, in another embodiment, the EGM 2 prior to retrofitting of the conversion device 1 is a part of a linked jackpot. As will be appreciated by those skilled in the art, in a linked jackpot a plurality of EGM's are communicatively linked via a network to a central gaming server. Contributions from each of the linked EGM's are accumulated by the central gaming server, which administers the linked jackpot across the network. It has been appreciated by the present inventors that in some circumstances a gaming operator may wish to disconnect a particular EGM from the linked jackpot. In such a circumstance, the conversion device 1 can be used to convert that EGM into an EGM having stand-alone jackpot functionality. Once the conversion device 1 has been retrofitted, the contributions from the EGM are no longer accumulated at the linked gaming controller. Rather, they are accumulated within the circuitry of the conversion device 1 in the manner described above with reference to the loop S3 to S6 of FIG. 2. In this embodiment the EGM is configured to monitor for when a jackpot award has been triggered. An example of a triggering event is the completion of a base game, such as a slot game for example, resulting in a symbol combination that has been pre-defined as a jackpot winning symbol combination. In this circumstance, the EGM 2 sends a signal advising the conversion device 1 that the jackpot has been won. This signal is received by the conversion device 1, which responds with a jackpot award signal that includes an indication of the current value of the jackpot. Upon receipt of the jackpot award signal, the EGM 2 awards the jackpot to the player using one of the methodologies outlined in detail above.

In yet another embodiment, the conversion device 1 is configured to administer a plurality of stand-alone jackpots, which are typically referred to by those skilled in the art as "jackpot levels". Separate jackpot amounts are accrued within the circuitry of the conversion device 1 for each of the jackpot levels. Once the processor 6 of the conversion device 1 determines that the trigger for one of the jackpot levels has been triggered, the conversion device 1 sends a jackpot award signal that includes the amount of the applicable jackpot level. This amount is then paid to the player using one of the methodologies outlined in detail above.

In yet another embodiment the conversion device 1 is configured to provide a plurality of stand-alone jackpots and to allow the player of the EGM 2 to make an input defining the stand-alone jackpot or jackpots in which the player wishes to participate whilst playing on the EGM 2. The plurality of stand-alone jackpots may be default jackpot games (i.e. having jackpot parameters that were pre-defined by the operators of the gaming venue) or may have been initiated by the player (i.e. having jackpot parameters that were defined by inputs made by the player). This embodiment makes use of the techniques disclosed in the applicant's granted Australian Patent Nos. 2007317181 and 2010202863, the contents of which are hereby incorporated in their entirety by way of cross reference.

While a number of preferred embodiments have been described, it will be appreciated by persons skilled in the art that numerous variations and/or modifications may be made to the invention without departing from the spirit or scope of the invention as broadly described. The present embodiments are, therefore, to be considered in all respects as illustrative and not restrictive.

The claims defining the invention are as follows:

1. A conversion device retrofitted into an electronic gaming machine (EGM) so as to convert the EGM from an EGM that functions without providing a stand-alone progressive jackpot into an EGM having at least one stand-alone progressive jackpot, said conversion device comprising:

an input port for receipt of data from the EGM;

an output port; and a processor configured to be responsive to said data so as to progressively accumulate at least one jackpot amount, said processor being responsive to a trigger so as to cause a jackpot award signal to be sent from the output port.

2. A conversion device according to claim 1, being sized so as to be housable within a cabinet of the EGM.

3. A conversion device according to claim 1, wherein the data includes a turnover of the EGM and wherein the processor is configured so as to increment the jackpot by a proportion of the turnover.

4. A conversion device according to claim 1, wherein the trigger is triggered when the jackpot amount is incremented to, or in excess of, a trigger amount.

5. A conversion device according to claim 1, wherein the data includes a game result and wherein the trigger is triggered when the game result falls within a predefined subset of game results.

6. A conversion device according to claim 1, wherein the conversion device has a plurality of output ports, at least one of the output ports being communicatively linkable to a centralised monitoring system.

7. A conversion device according to claim 6, wherein the plurality of output ports replicate a plurality of output ports native to the EGM.

8. A conversion device according to claim 1, wherein the EGM has a gaming machine interface card and wherein the input port of the conversion device receives said data from said gaming machine interface card.

9. A conversion device according to claim 1, wherein the processor is configured so as to receive a display signal from the EGM and to adapt the display signal of the EGM so as to produce an adapted display signal that includes a current value of the jackpot amount and to cause the EGM to display the adapted display signal.

10. A conversion device according to claim 1, wherein a secondary display is retrofittable onto the EGM so as to be visible by a player of the EGM and wherein the secondary display is driven by the conversion device so as to display a current value of the jackpot amount.

11. A conversion device according to claim 1, wherein the EGM has native credit dispensing hardware and wherein the jackpot award signal is sent from the output port to the EGM so as to instruct the EGM to use the native credit dispensing hardware to pay the jackpot to a player of the EGM.

12. A conversion device according to claim 1, wherein credit dispensing hardware is retrofittable to the EGM and wherein the jackpot award signal is sent from the output port to the retrofitted credit dispensing hardware so as to instruct the retrofitted credit dispensing hardware to pay the jackpot to a player of the EGM.

13. A conversion device according to claim 1, wherein the jackpot award signal is sent from the output port so as to instruct an attendant to pay the jackpot to a player of the EGM.

14. A conversion device according to claim 13, wherein the processor is responsive to a triggering of the trigger so as to send an instruction to the EGM to freeze play of the EGM until such time as the attendant provides an input to the EGM to confirm that payment of the jackpot has occurred.

15. A conversion method comprising:

providing an electronic gaming machine (EGM) that functions without providing a stand-alone progressive jackpot;

providing a conversion device having an input port, an output port and a processor;

retrofitting the conversion device into the EGM such that the input port is connected for receipt of data from the EGM and such that the processor is configured to be responsive to said data so as to progressively accumulate at least one jackpot amount, said processor being responsive to a trigger so as to cause a jackpot award signal to be sent from the output port to the EGM, thereby to convert the EGM into an EGM having at least one stand-alone progressive jackpot.

16. A conversion method according to claim 15, wherein the conversion device is housed within a cabinet of the EGM.

17. A conversion method according to claim 15, wherein the data includes a turnover of the EGM and wherein the processor is configured so as to increment the jackpot by a proportion of the turnover.

18. A conversion method according to claim 15, wherein the EGM has native credit dispensing hardware and wherein the jackpot award signal is sent from the output port to the EGM so as to instruct the EGM to use the native credit dispensing hardware to pay the jackpot to a player of the EGM.

19. A conversion method according to claim 15, wherein credit dispensing hardware is retrofittable to the EGM and wherein the jackpot award signal is sent from the output port to the retrofitted credit dispensing hardware so as to instruct the retrofitted credit dispensing hardware to pay the jackpot to a player of the EGM.

20. A conversion method according to claim 15, wherein the jackpot award signal is sent from the output port so as to instruct an attendant to pay the jackpot to a player of the EGM.

* * * * *